| (12) | United States Patent<br>Peterson et al. | (10) Patent No.: US 8,344,897 B2<br>(45) Date of Patent: Jan. 1, 2013 |
|---|---|---|

(54) SYSTEM AND METHOD FOR ASSISTING IN THE REFILLING OF AGRICULTURAL VEHICLES

(75) Inventors: John Peterson, Jackson, MN (US); Dave Lovell, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 663 days.

(21) Appl. No.: 12/577,508

(22) Filed: Oct. 12, 2009

(65) Prior Publication Data

US 2011/0084851 A1    Apr. 14, 2011

(51) Int. Cl.
G08B 21/00    (2006.01)
(52) U.S. Cl. .......................................... 340/612; 701/50
(58) Field of Classification Search .................. 340/612, 340/617, 691.1, 691.5, 438, 450, 450.2; 701/50, 701/426, 468
See application file for complete search history.

(56) References Cited

U.S. PATENT DOCUMENTS

| 4,100,538 | A | * | 7/1978 | Knepler | ........................ | 340/617 |
| 4,462,079 | A | * | 7/1984 | Ito et al. | .......................... | 701/50 |
| 5,955,973 | A | * | 9/1999 | Anderson | ..................... | 340/988 |
| 6,167,337 | A | * | 12/2000 | Haack et al. | ..................... | 701/50 |
| 6,606,542 | B2 | * | 8/2003 | Hauwiller et al. | .............. | 701/50 |
| 2004/0236504 | A1 | | 11/2004 | Bickford et al. | | |
| 2006/0293849 | A1 | | 12/2006 | Baldwin | | |
| 2009/0099737 | A1 | * | 4/2009 | Wendte et al. | .................. | 701/50 |
| 2010/0042297 | A1 | * | 2/2010 | Foster et al. | .................... | 701/50 |
| 2010/0191404 | A1 | * | 7/2010 | Ishikawa et al. | ........... | 340/691.6 |

* cited by examiner

Primary Examiner — Thomas Mullen
(74) Attorney, Agent, or Firm — Hovey Williams LLP

(57) ABSTRACT

A system and method for directing when and where an agricultural vehicle should refill a container thereof may comprise a sensor for detecting an amount of material in the container, a location determining device, and a processing device communicably coupled with the sensor and the location determining device, as well as a display, a speaker, and/or an automated steering system. The processing device may use information regarding the amount of material in the container, the location of the agricultural vehicle, and a variety of other factors to determine when the container needs to be refilled and to determine a refill location at which the agricultural vehicle should refill. The processing device may send these refill instructions to the display, the speaker, and/or the automated steering system. The processing device may also alert a refill vehicle to travel to the determined refill location, if necessary.

16 Claims, 4 Drawing Sheets

SYSTEM AND METHOD FOR ASSISTING IN THE REFILLING OF AGRICULTURAL VEHICLES

BACKGROUND

1. Field

Embodiments of the present invention relate to agricultural vehicles. More particularly, embodiments of the present invention relate to a system and method for assisting in the refilling of a container of an agricultural vehicle.

2. Related Art

Agricultural vehicles must be periodically refilled with seeds, fertilizer, pesticides, herbicides, water, and other applied materials and with fuel. When used to apply substances to large and/or remote fields, it is not always practical to drive an agricultural vehicle back to a central filling station. Thus, agricultural vehicles are often filled in-place with refilling vehicles. To minimize re-filling time, an operator generally attempts to estimate when the vehicle needs to be filled (with material or with fuel) and in what position to place the vehicle in order to allow refilling vehicles and refilling equipment to reach the vehicle's associated ports and fill points. Leaving this determination up to the operator is not very efficient or accurate. For example, if an operator estimates he can make one more pass across a field with the amount of material remaining in a hopper of the vehicle, but estimates incorrectly and runs out of material remote from a refilling station or refilling location, the operator must travel to the refilling location and back to the stopping point while not dispensing any of the material onto the field, wasting both time and fuel.

SUMMARY

Embodiments of the present invention solve the above-mentioned problems and provide a distinct advance in the art of agricultural vehicles. More particularly, embodiments of the invention provide a system and method for determining an optimal place and time to refill a container of an agricultural vehicle.

An embodiment of the system may comprise at least one sensor for detecting an amount of material in the container, a location determining device for determining a location of the agricultural vehicle, and a processing device communicably coupled with the sensor and the location determining device. The system may further comprise a display, a speaker, and/or an automated steering system communicable coupled with the processing device.

The processing device may be configured to determine an optimal place and time for refilling based on a plurality of factors and output corresponding navigation instructions to at least one of the display, the speaker, and the automated steering system. The factors used by the processing device may correspond with the amount of material in the container, the dimensions of a field to be covered by the agricultural vehicle, instructions for dispensing material in the field, rate at which the material in the container is dispensed, acceptable refill locations, a status of a refilling vehicle, and/or a location of a refilling vehicle relative to various refill locations. The processing device may also be configured to notify at least one refilling vehicle to travel to a refill location based on a plurality of factors, including a status and/or location of the agricultural vehicle and a status and/or location of the refilling vehicle.

An embodiment of the method may include receiving at the processing device a level signal regarding an amount of material in the container and a location signal regarding a location of the agricultural vehicle. The processing device then determines when the container needs to be refilled and a refill location at which the agricultural vehicle should refill, based on the level signal and/or the location signal and possibly other factors. The processing device then sends refill instructions, including when to refill the container and the refill location, to a display, a speaker, and/or an automated steering system.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
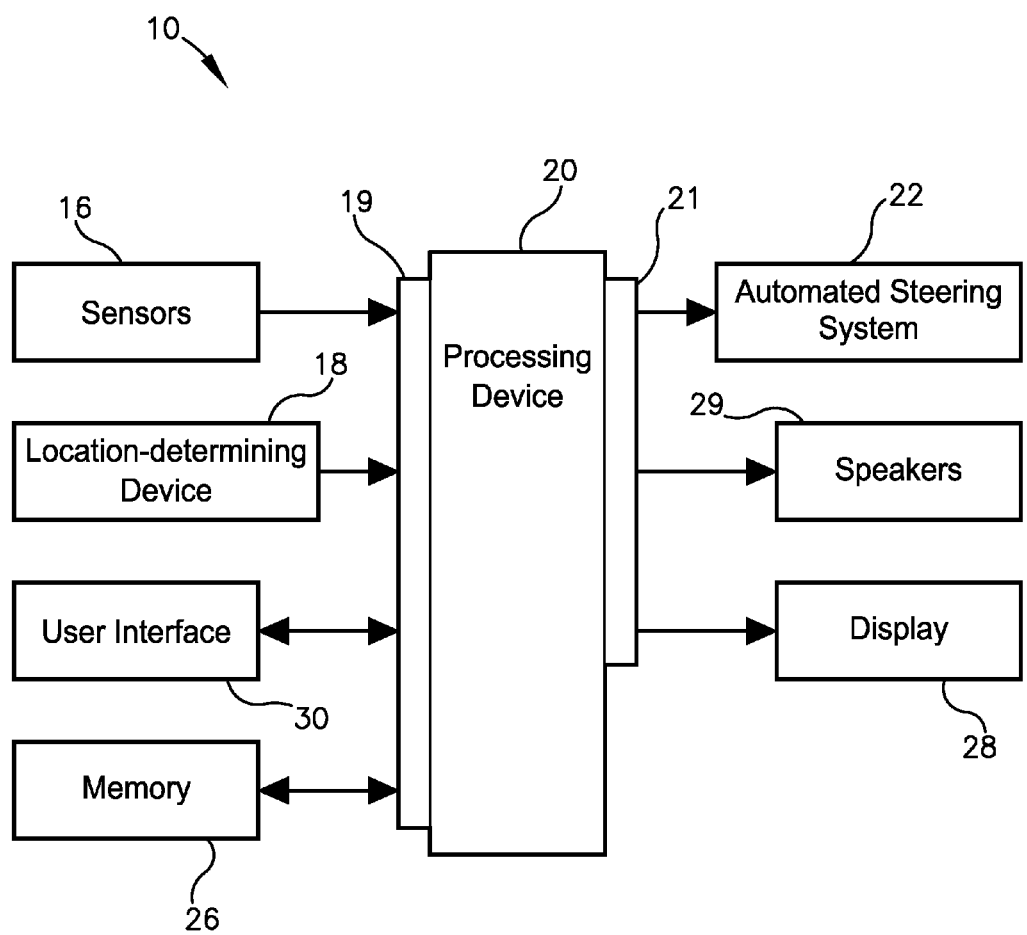
FIG. 1 is a block diagram illustrating a refill notification system constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
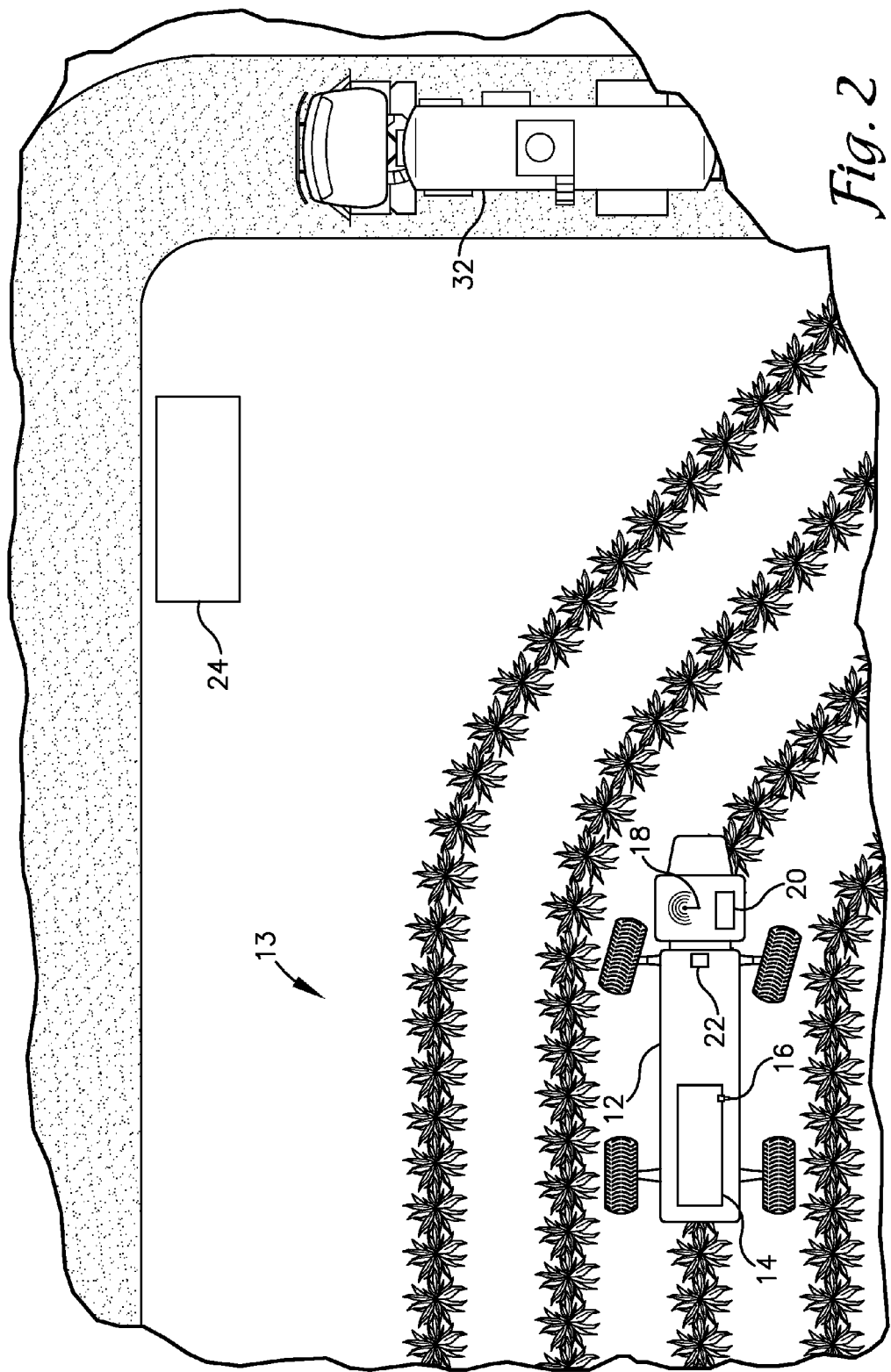
FIG. 2 is a schematic diagram showing an agricultural vehicle equipped with the refill notification system positioned on an agricultural field along with a refill vehicle.

FIG. 1 illustrates a refill notification system 10 constructed in accordance with an exemplary embodiment of the invention. As shown in FIG. 2, the system 10 may be installed or mounted on an agricultural vehicle 12 and used to calculate a proper time and a proper location for an agricultural vehicle 12 to refill at least one container 14. The agricultural vehicle 12 may be any vehicle operable to dispense a material, such as a spreader, sprayer, or seeder by Willmas®, RoGator®, Sunflower®, or White®. The container 14 may be any container that holds and/or dispenses the material, such as a seed hopper, herbicide tank, pesticide tank, fuel tank, etc. The material may be fuel or other liquid used during operation of the vehicle 12, pesticides, herbicides, seeds, fertilizers, or any other material which may be used up or dispensed during operation of the vehicle 12. The vehicle 12 may operate within a field 13 and the container 14 may be refilled at least one refill location 24 by refill equipment permanently located at the refill location 24 or by at least one refill vehicle 32, as described herein.

The system 10 may be physically, communicably, and/or integrally coupled with the vehicle 12 or any systems or components of the vehicle 12, and may be implemented in hardware, software, firmware, or a combination thereof. An exemplary embodiment of the system 10 may comprise one or more sensors 16, a location-determining device 18, and a processing device 20. The processing device 20 may have or be coupled with one or more input ports or terminals 19 and one or more output ports or terminals 21 and is configured to use information received from the sensors 16 and/or the location-determining device 18 to determine information relevant to refilling the vehicle 12, as described herein. The system 10 may also comprise an automated steering system 22 integral and/or communicably coupled with the processing device 20 and configured for automated steering of the vehicle 12 to the refill location 24. Additionally, the system 10 may comprise memory 26, a display 28, one or more speakers 29, and/or a user interface 30.

The sensors 16 may be any one or more sensors providing information about the vehicle 12, its fuel, its materials, and its surroundings. For example, the sensors 16 may include an optical sensor, a radar sensor, a speedometer, a weight sensor, a flow meter, a seed counter, etc. The sensors 16 may be communicably coupled with the processing device 20 via the input ports 19. The sensors 16 may be located anywhere on the vehicle 12, such as in the container 14 and/or proximate an opening of the container 14.

The location-determining device 18 may determine locations or positions of the vehicle 12 as it is moved from place to place and may generate and send corresponding position data to the processing device 20 via the input ports 19. The vehicle's location or position may include, latitude, longitude, and/or altitude. In one embodiment, the location-determining device 18 may be a satellite navigation receiver that works with a global navigation satellite system (GNSS) such as the global positioning system (GPS) operated by the United States, the GLONASS system operated by and within the former Soviet Union territory, or the Galileo system operated by Europe. Alternatively, other methods of geographic location may be employed by the location-determining device 18, such as signal triangulation. The location-determining device 18 may be integral with and/or communicably coupled with the sensors 16 and the processing device 20 and may be configured to provide location information regarding the vehicle 12 to the processing device 20.

The processing device 20 may comprise any number and combination of processors, controllers, integrated circuits, programmable logic devices, or other data and signal processing devices for carrying out the functions described herein, and may be coupled with or comprise memory 26, transmitters, receivers, and/or communication busses. As illustrated in FIG. 2, the processing device 20 may both receive and output a plurality of signals and may be communicably coupled with the sensors 16, the location-determining device 18, the automated steering system 22, the memory 26, the display 28, the one or more speakers 29, and/or the user interface 30. Furthermore, the processing device 20 may comprise or be integrally and/or communicably coupled with the input 19 and the output 21 configured for sending and receiving data signals, respectively.

The inputs 19 may be any sort of wire, fiber optic cable, wireless receiver, etc. operable for receiving data signals from one or more of the sensors 16, the location-determining device 18, and other components data storage or data transmission devices described herein and the like. The inputs 19 may also be operable to provide the data signals, received from the sensors 16, etc., to the processing device 20. The inputs 19, for example, may be a wire extending from one of the sensors 16 and/or an input jack communicably coupled and/or integral to the processing device 20.

Similarly, the outputs 21 may be any sort of wire, fiber optic cable, wireless transceiver, etc. operable for transmitting data or command signals from the processing device 20 to the automated steering system 22 or other devices described herein for receiving output from the processing device 20. The outputs 21, for example, may be a wire and/or an output jack coupled together with and between the processing device 20 and the automated steering system 22 or a display later described herein. In another example, the outputs 21 may transmit signals to at least one of the refilling vehicles 32 and/or output instructions or an alarm notification over a loud speaker to any of the refilling vehicles 32.

In various embodiments, the processing device 20 may implement a computer program and/or code segments to perform some of the functions described herein. The computer program may comprise a listing of executable instructions for implementing logical functions in the processing device 20. The computer program can be embodied in any computer readable medium for use by or in connection with an instruction execution system, apparatus, or device, and execute the instructions. In the context of this application, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electro magnetic, infrared, or semi conductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), combinations thereof, and the like.

The memory 26 may be integral with the processing device 20, stand alone memory, or a combination of both. The memory 26 may include, for example, removable and non-removable memory elements such as RAM, ROM, flash, magnetic, optical, USB memory devices, and/or other memory elements. The memory 26 may store various data associated with the operation of the system 10, such as the computer program and code segments mentioned above, or other data for instructing the processing device 20 and system elements to perform the steps described herein.

The memory 26 may also store or may be operable to store information regarding the vehicle 12 and its environment, such as locations where the vehicle 12 may refill (i.e. refill location 24), parameters for determining that the vehicle 12 should refill, what materials and/or fuel is required by the vehicle 12, what materials and/or fuel is available by various refilling vehicles 32 or refilling stations, availability and/or location of various refilling vehicles 32, amount of material to be dispensed, size of a field to be covered by the material, size of the container 14, position and/or direction required of the vehicle 12 for refilling at a particular refill location 24, other requirements of a particular refill location 24 or refill station, etc. The memory 26 may also receive additional data from a user or operator of the vehicle 12 as well as from other external or internal devices before, during, or after operation.

The automated steering system 22 may comprise any combination of hardware and software and may be integral with and/or communicably coupled to the processing device 20 and/or the vehicle 12. The automated steering system 22 may control any aspect of vehicle operation typically controlled by a user to direct the vehicle 12 to a desired location or in a desired direction. For example, the automated steering system 22 may send signals to an actuator (not shown) for turning wheels of the vehicle 12 depending on guidance information received from the processing device 20. Additionally, the automated steering system 22 may control the speed of the vehicle 12.

The display 28 may be used to display various information corresponding to the vehicle 12, guidance information, and refilling information, such as when the vehicle 12 needs to be refilled and the nearest refill location 24. The display 28 may comprise conventional black and white, monochrome, or color display elements including CRT, TFT, LCD, and/or plasma display devices. Preferably, the display 28 may be of sufficient size to enable a user to easily view it while operating the vehicle 12. The display 28 may be integrated with the user interface 30, such as in embodiments where the display 28 is a touch-screen display to enable the user to interact with it by touching or pointing at display areas to provide information to the processing device 20.

The speakers 29 may be one or more speakers of any type, such as built-in speakers integral with the agricultural vehicle 12 and/or the processing device 20. The speakers 29 may be configured for providing audible instructions and feedback. For example, the speakers may be communicably coupled with the processing device 20 such that the processing device 20 may send data signals comprising instructions for a vehicle operator to the speakers 29.

The user interface 30 may permit an operator of the vehicle 12 to operate the system 10 and/or the vehicle 12. The user interface 30 may comprise one or more functionable inputs such as buttons, switches, scroll wheels, a touch screen associated with the display 28, voice recognition elements such as a microphone, pointing devices such as mice, touchpads, tracking balls, styluses, a camera such as a digital or film still or video camera, combinations thereof, etc. Further, the user interface 30 may comprise wired or wireless data transfer elements such as a removable memory including the memory 26, data transceivers, etc., to enable an operator the vehicle 12 and/or other devices or parties to remotely interface with the system 10.

The user interface 30 may be operable to provide various information to an operator of the vehicle 12 utilizing the display 28 or other visual or audio elements such as the speaker 29. Thus, the user interface 30 may enable the operator and the system 10 to exchange information relating to the system 10, including location data, navigation information, waypoints, refill locations 24, refill parameters, alerts and alert notifications, etc.

Refill locations 24, as illustrated in FIG. 1, may or may not be marked and may be any locations pre-designated by the user and/or pre-programmed into the memory storage devices. For example the refill locations 24 may be locations to which the refilling vehicle 32, such as a tender, can travel without encountering obstacles such as trees or overly steep or rugged terrain. Additionally, the refill locations 24 may be outward of the field 13 or an area of the field 13 in which the material is being applied, such that the refilling vehicles 32 do not travel onto the field to refill the vehicle 12.

The above-described system 10 may be used to implement a method of determining when and where to refill the agricultural vehicle 12 and to direct the agricultural vehicle 12 to an appropriate refill location, such as refill location 24. The method broadly comprises using information regarding the amount of material in the container 14, the location of the agricultural vehicle 12, and a variety of other factors as described herein to determine when and where the container 14 needs to be refilled. Such information may be sent as refill instructions to the display 28, the speaker 29, and/or the automated steering system 22. Additionally, the refill vehicle 32 may be alerted to travel to the determined refill location 24, if necessary.

Figure 3:
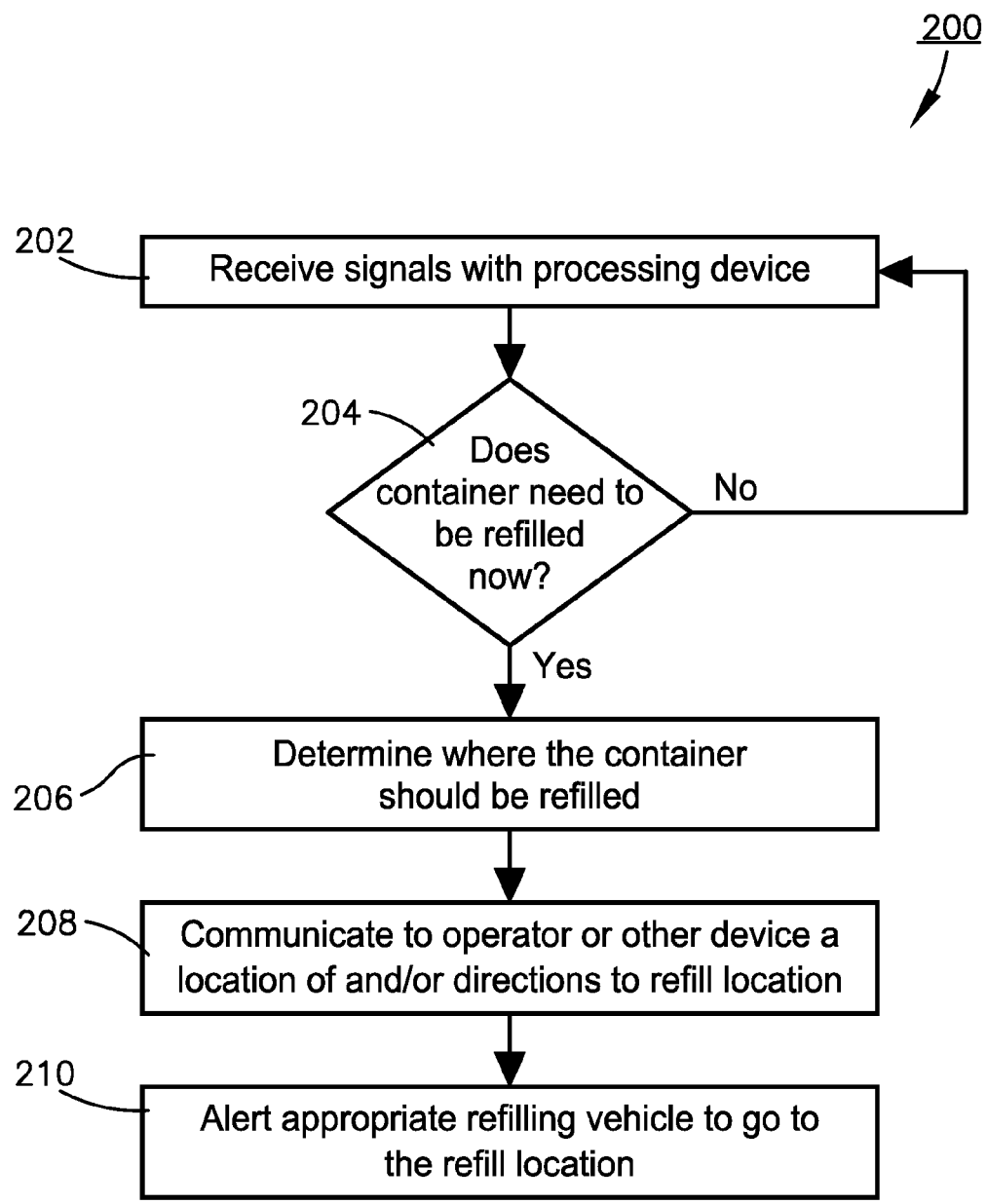
FIG. 3 is a flow chart of a method of determining when and where to refill the agricultural vehicle in accordance with an embodiment of the invention.
Figure 4:
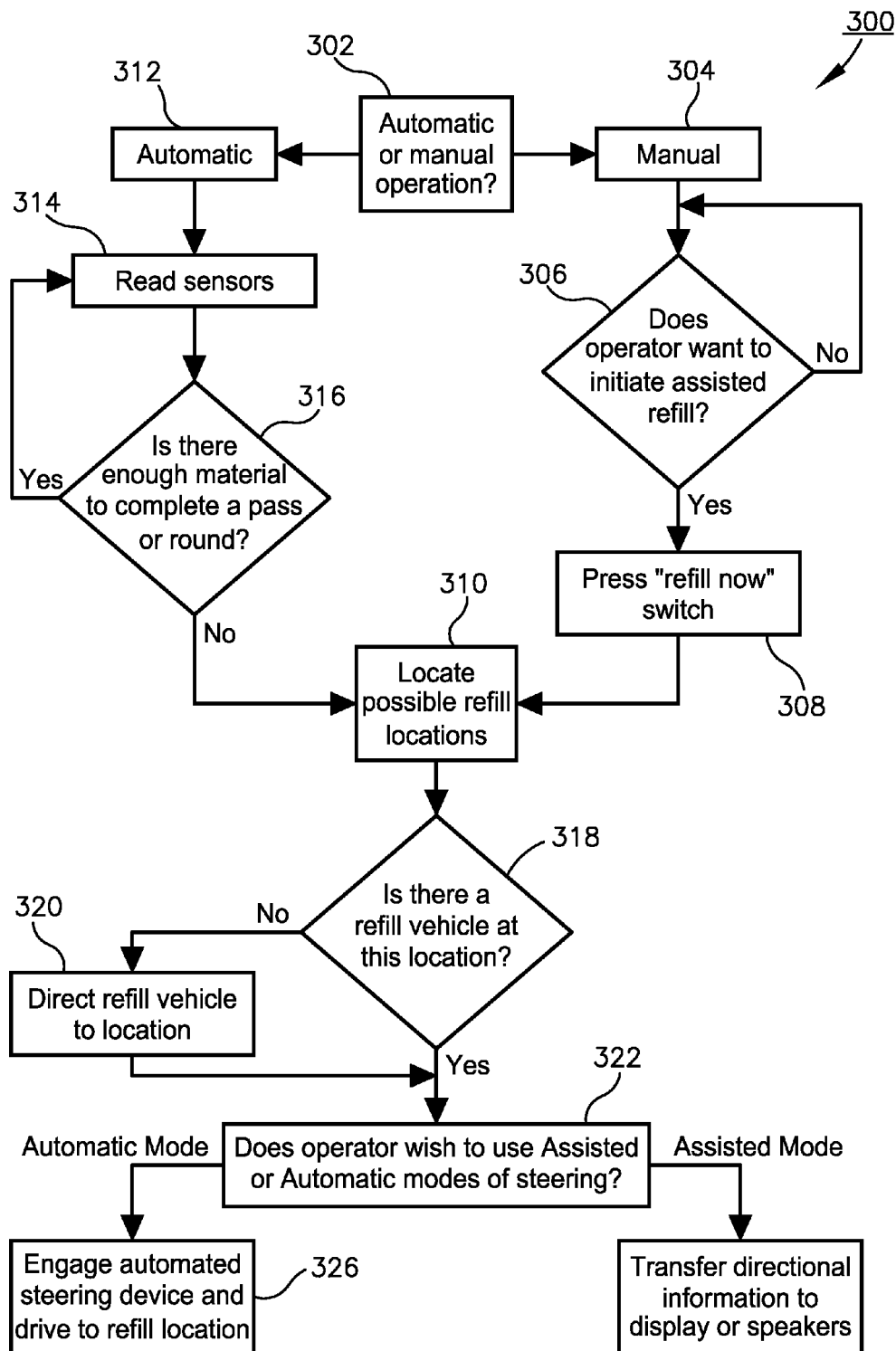
FIG. 4 is a flow chart of a method of both automatic and manual use of the system of FIG. 1.

The flow charts of FIGS. 3 and 4 depict the steps of exemplary methods of the invention in more detail. In this regard, some of the blocks of the flow chart may represent a module segment or portion of code of the computer programs stored in or accessible by the processing device 20. In some alternative implementations, the functions noted in the various blocks may occur out of the order depicted in FIGS. 3 and 4. For example, two blocks shown in succession in FIG. 3 or 4 may in fact be executed substantially concurrently, or the blocks may sometimes be executed in the reverse order depending upon the functionality involved.

FIG. 3 illustrates a method 200 for determining information regarding refilling the agricultural vehicle 12 according to one embodiment of the invention. First, the processing device 20 may receive a data signal such as a level signal from the sensors 16 and/or a location signal from the location-determining device 18, as depicted in step 202. The level signal may comprise information about the amount of material in the container 14 and the location signal may comprise information regarding a location of the vehicle 12. The data signals may further comprise measurement information, status information, location information, etc., as described above and received from any of the sensors 16-18, the user interface 30, and/or from memory 26.

As depicted in step 204, the processing device 20 may determine if one or more parameters or particular criteria are met to require or request the vehicle 12 and/or the operator of the vehicle 12 to go refill the container 14. The particular criteria may include any combination of an amount of material or fuel remaining, an amount of fuel or material used per time segment and/or distance segment, an amount of time segments and/or distance segments remaining to complete a particular segment of the field, an approximate time and/or distance until a next refill location is reached, proximity of refilling vehicles 32 to a desired refill location, etc. For example, based on tracking of average amounts of material used over particular distance intervals or over the course of a single pass across the field, the system 10 may notify the operator that the vehicle 12 will not be able to make a full pass across the field and back to the refill location 24 with the material remaining.

If the particular criteria has been met, the processing device 20 may notify an operator via the display 28 and/or the speakers 29, and the operator may indicate to the processing device 20 a desire to refill the container 14. For example, the operator may switch the vehicle 12 and/or the processing device 20 from a "field mode" to a "refill mode" using the user interface 30, such as by pushing a button. Alternatively, the processing device may automatically proceed under the assumption that refilling of the container is now desired, as illustrated in FIG. 3.

In one embodiment of the invention, the processing device 20 may output a plurality of possible refill locations and other refill options continually to the display 28, for example, until a particular refill location or refill option is no longer available or practical due to factors such as distance of the vehicle 10 from particular refill locations and the amount of the material left, etc. Once the particular refill location or refill option is no longer available or practical, the processing device 20 may stop outputting it to the display 28.

The processing device may then determine where the vehicle 12 should go to refill the container 14, as depicted in step 206, and then communicate this information to an operator or another device, as depicted in step 208. In one embodiment of the invention, the processing device 20 may send refill instructions to the display 28, the speaker 29, and/or the automated steering system 22. For example, information regarding when the vehicle 12 should go to refill, where the vehicle 12 should go to refill, navigational instructions for how to get to the refill location 24, and other pertinent information regarding refilling the container 14 may be displayed on the display 28.

In various embodiments of the invention, the system 10 may command an operator and/or the automated steering system 22 to drive the vehicle 12 to the nearest fill location 24 based on the amount of fuel and/or materials, the distance left to cover, the distance from the refill location 24, the average, median, and/or maximum amount of fuel and/or material used or dispensed per some measurement unit (such as per square foot, per minute, etc.). The average, median, and/or maximum amount of fuel and/or material used per some measurement unit may also depend on additional factors such as speed, incline, etc. Therefore, various algorithms may calculate when refilling the container 14 will be required based on these additional factors.

Based on geographic data regarding a nearest refill location 24, the system 10 may recommend a particular fill location and/or direct the vehicle 12 to that fill location. If the fill location 24 requires one of the refilling vehicles 32 to meet the vehicle 12, the system 10 may send a message to alert an appropriate refilling vehicle 32 that the vehicle 12 is on its way to the refill location 24 to be refilled, as depicted in step 210, such that if the refilling vehicle 32 is away from the refill location 24, it may return in time to refill the vehicle 12. The refilling vehicle 32 may be automated or may be operated manually by an operator.

Additionally, a location where the vehicle 12 stopped dispensing the material before traveling to refill may be stored in memory 26 and communicated to the operator and/or another device such as the automated steering system 22 once refilling is complete, such that the vehicle 12 may return to its previous location to continue dispensing the material.

FIG. 4 illustrates an exemplary embodiment of a method 300 of operating the system 10 in either automatic or manual modes. First an operator may choose, using the user interface 30, whether automatic or manual operation of the agricultural vehicle 12 is desired, as depicted in step 302. If manual operation is chosen, as in step 304, an operator may then determine if it is a proper time to request assistance in refilling the vehicle 12, as depicted in step 306. If the operator chooses to request assistance in refilling the vehicle 12, as in step 308, then the processing device 20 may begin to search for possible refill locations, as indicated in step 310.

Alternatively, if the operator chooses automatic operation, as depicted in step 312, then the processing device 20 may read the sensors 16, as depicted in step 314. The processing device 20 may then use information from the sensors 16 as well as other data stored in memory 26, received from the user interface 30, and/or received from the location-determining device 18 to determine if there is enough material to complete a pass or round across the field, as depicted in step 316. If there is not, then the processing device 20 may begin to search for possible refill locations, as depicted in step 310.

Next, after choosing one of the refill locations 24, the processing device 20 may determine if one of the refill vehicles 32 is located at the desired refill location 24, as depicted in step 318. If not, then the processing device 20 may instruct a desired one of the refill vehicles 32 to travel to the refill location 24, as depicted in step 320.

As depicted in step 322, the operator may choose between assisted or automatic steering modes once the refill location 24 is chosen. In assisted mode, directional information may be transferred to the display 28 or speakers 29 to allow the operator to follow the directions to the refill location 24, as depicted in step 324. In automatic mode, the automated steering device 22 may be engaged and may drive to the refill location, as depicted in step 326. Additionally, the automatic mode may allow various auto refill sensors (not shown) to be engaged.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for directing an agricultural vehicle to a refill location, the system comprising:
   at least one input configured to receive at least one of a level signal regarding an amount of material in a container of the agricultural vehicle and a location signal indicating a geographic location of the agricultural vehicle;
   a processing device communicably coupled with the input and configured to determine navigation instructions regarding when and where to travel to refill the container based on at least one of the level signal and the location signal; and
   at least one output configured to output the navigation instructions to at least one of a display, an automated steering system, and a speaker.

2. The system of claim 1, wherein the processing device is further configured to determine the navigation instructions regarding when and where to travel to refill the container based on any combination of one or more of the dimensions of a field to be covered by the agricultural vehicle, instructions for dispensing the material in the field, rate at which the material in the container is dispensed, acceptable refill locations, a status of a refilling vehicle, and a location of a refilling vehicle relative to various refill locations.

3. The system of claim 1, wherein the processing device is configured to notify at least one refilling vehicle to travel to a refill location, wherein the processing device is configured to determine which refilling vehicle to notify based on at least one of a status of the at least one refilling vehicle, a distance of the at least one refilling vehicle from a refill location, a distance of the agricultural vehicle from the refill location, and a status of the agricultural vehicle.

4. The system of claim 1, further comprising at least one sensor for sending at least one of the level signal and the location signal to the input.

5. The system of claim 1, further comprising at least one of the display, the automated steering system, and the speaker configured for receiving the navigation instructions from the output.

6. A system for directing an agricultural vehicle to a refill location, the system comprising:
- a sensor configured to detect the amount of material in a container of the agricultural vehicle;
- a location determining device configured to determine a geographic location of the agricultural vehicle;
- at least one of a display, a speaker, and an automated steering system; and
- a processing device communicably coupled with the sensor and the location determining device and configured to determine and output navigation instructions to at least one of the display, the speaker, and the automated steering system regarding when and where to travel to refill the container based on a plurality of criteria,
- wherein the plurality of criteria corresponds with any combination of one or more of the amount of material in the container, the dimensions of a field to be covered by the agricultural vehicle, instructions for dispensing the material in the field, rate at which the material in the container is dispensed, acceptable refill locations, a status of a refilling vehicle, and a location of a refilling vehicle relative to various refill locations.

7. The system of claim 6, wherein the processing device is configured to notify at least one refilling vehicle to travel to a refill location, wherein the processing device is configured to determine which refilling vehicle to notify based on at least one of a status of the refilling vehicle, a distance of the refilling vehicle from a refill location, a distance of the agricultural vehicle from the refill location, and a status of the agricultural vehicle.

8. A method of directing an operator of an agricultural vehicle regarding when and where to refill a container of the agricultural vehicle, the method comprising:
- receiving with a processing device a level signal containing information regarding an amount of material in the container;
- receiving with the processing device a location signal regarding a location of the agricultural vehicle;
- determining with the processing device, at least partially based on the level signal and the location signal, when the container needs to be refilled;
- determining with the processing device a refill location at which the agricultural vehicle should refill; and
- sending refill instructions, including when to refill the container and the refill location, to at least one of a display, a speaker, and an automated steering system.

9. The method of claim 8, further comprising:
- selecting a refill vehicle using the processing device based on at least one of a status of the refill vehicle and a distance of the refill vehicle relative to the refill location; and
- sending a signal to the refill vehicle using the processing device instructing the refill vehicle to go to the refill location.

10. The method of claim 9, wherein the processing device determines which refilling vehicle to notify based on at least one of a status of the at least one refilling vehicle, a distance of the at least one refilling vehicle from a refill location, a distance of the agricultural vehicle from the refill location, and a status of the agricultural vehicle.

11. The method of claim 8, wherein the refill instructions further comprise navigational instructions.

12. The method of claim 8, wherein the processing device determines when the container needs to be refilled based on any combination of one or more of the amount of material in the container, the dimensions of a field to be covered by the agricultural vehicle, navigational instructions, rate at which the material in the container is dispensed, acceptable refill locations, a status of a refilling vehicle, and a location of a refilling vehicle relative to various refill locations.

13. A physical and non-transitory computer readable medium encoded with code segments for causing a processing device to determine information regarding refilling of a container of an agricultural vehicle, the computer readable medium comprising:
- a first code segment executable by the processing device for obtaining information from at least one of a sensor, memory, a user interface, and a location-determining device regarding an amount of material in the container and a location of the agricultural vehicle;
- a second code segment executable by the processing device for determining if the container needs to be refilled; and
- a third code segment executable by the processing device for determining and sending refill instructions, including a desired refill location, to at least one of a display, a speaker, and an automated steering system.

14. The computer readable medium of claim 13, wherein determining if the container needs to be refilled is determined by comparing an amount of material in the container, a location of the agricultural vehicle, a rate at which the material is being dispensed, and a nearest refill location.

15. The computer readable medium of claim 13, wherein the refill instructions further include navigational information for driving the agricultural vehicle to the refill location.

16. The computer readable medium of claim 13, further comprising a fourth code segment executable by the processing device for transmitting instructions to a refill vehicle to travel to the refill location.

* * * * *